3,508,985
METHOD FOR MAKING A PICTORIAL PHONOGRAPH RECORD EMPLOYING A SOLUTION OF POLYVINYL ALCOHOL AS BONDING AGENT
Kumao Sakamoto, 1229 Takahatadaido-cho, Nara-shi, Nara-ken, Tokyo, Japan
No Drawing. Filed May 29, 1967, Ser. No. 642,179
Claims priority, application Japan, Oct. 12, 1966, 41/66,597
Int. Cl. B32b 27/00
U.S. Cl. 156—62.2               9 Claims

ABSTRACT OF THE DISCLOSURE

The invention relates to an improvement in the method for making pictorially illustrated phonograph records, the improvement being the use of a solution of polyvinyl alcohol in water as a bonding agent for bonding the plastic surface material in which the sound track is impressed to the printed matter.

SUMMARY OF THE INVENTION

The invention relates to a method for making phonograph records having pictorial representations thereon; more particularly, it relates to an improved method for bonding surface material of a phonograph record onto pictorial material.

Pictorially illustrated phonograph records are well known in the art, and comprise a core material having bonded thereto pictorial material on a base of paper stock with the surface material in which recording grooves are impressed bonded to the paper stock over the pictorial material. The surface material in which the sound track grooves are impressed is of transparent material, ordinarily, thermoplastic material.

In the manufacture of pictorially illustrated records, a single core covered with a bonding agent is positioned between two opposing matrices of a conventional record press carrying sound track molds or dies, a circular piece of paper stock bearing the pictorial illustration placed adjacent each side of the core with the illustration facing outwardly and a preform of the thermoplastic material for making the surface layer placed adjacent each pictorial illustration. Pressure is then applied to the assembly accompanied by heat to plasticize the plastic and a dual pictorial phonograph record made with a pictorially illustrated record on each side of the core covered with surface material in which the sound track grooves are impressed. A single-faced record can, of course, be made by the same procedure.

One of the chief disadvantages encountered in making pictorial phonograph records is warping or distortion of the paper bearing the illustration due to lateral and radial stresses created by the plastic surface material as it flows over the illustration while being extruded in the record press. One factor contributing to this damage is the type of bonding agent used between the transparent synthetic resin outer surface layer and the illustrated material. This invention relates to an improved bonding agent between the printed paper or other illustrative material and the outer layer of synthetic resin in which the recording grooves are impressed.

In the conventional method of making pictorially illustrated phonograph records, the paper stock or base on which the illustration, such as a photograph, is printed, is bonded to the inner core by various type conventional bonding agents. Also, the inner core may be of metal, such as that disclosed in U.S. Patent No. 2,528,611, or non-metallic material such as that disclosed in my U.S. Patent No. 3,050,433.

It is an object of this invention to provide a method for making a pictorially illustrated phonograph record in which distortion or rupture of the illustration or other printed material on paper stock or other material is prevented.

It is another object of this invention to provide a method for making a pictorially illustrated phonograph record in which the photograph or other printed material is visible through the surface material and the sound track embedded therein.

The above and other objects are accomplished by the improvement over conventional methods wherein the outer transparent layer of thermoplastic material bearing the sound track is bonded to the pictorial material by a bonding agent comprising a solution of about 50 to 100 grams of polyvinyl alcohol in one liter of water. A modification is the use as a bonding agent of a solution of one liter of water to which is added about 50 to 100 grams of polyvinyl alcohol dissolved in one liter of methyl alcohol.

The core material used for making a single-faced or double-faced record by the method of this invention may be of metal or of non-metal, the invention being illustrated by use of a core made as disclosed in my U.S. Patent No. 3,050,433. The paper stock or base on which the pictorial illustration is ordinarily printed should be of such construction that it can be readily bonded to the core simultaneously as the surface material is bonded to the pictorial material in the record press. A conventional bonding agent, such as that disclosed in Patent No. 2,528,611, may be used to bond the paper stock to the core, or the paper stock may be bonded to the core through the heat and pressure of the record press. The material of the outer surface of the record bearing the sound track or recording grooves, is conventionally a vinyl chloride resin, such as that disclosed in Patent No. 2,528,611 or may be a copolymer of vinyl chloride and vinyl acetate having a percentage of vinyl chloride from 85–82 and vinyl acetate from 15–13.

In accordance with the preferred embodiment of the invention, a solution of about 50 to 100 grams of polyvinyl alcohol in one liter of water was applied to the printed pictorial surface of a circular piece of paper stock or base by air spray techniques. Vinyl chloride powder, or the surface material as described above, was then dispersed uniformly over the surface of the printed paper which had been wetted with the bonding agent. The surface material was applied in a preferred thickness of from 0.2 mm. to 0.5 mm. The printed paper bearing the bonding agent and the surface material was then passed through a drying chamber on a conveyor and dried at a temperature of 100° C.–120° C. The drying step was followed by a preliminary heating step to plasticize the surface material. As a result of the preliminary heating step, the vinyl chloride resin surface material was converted into the state of a semi-gel and immediately thereafter the printed paper assembly was pressed lightly with a heating roller at a temperature between 80° C. and 100° C. to better adhere the vinyl resin onto the printed surface of the paper stock. The assembly of paper stock bearing the illustration, bonding agent and surface agent was then ready for "coring" onto a central core to make either a single-faced or double-faced record.

An assembly was then made of a suitable flat circular core material as described above on each side of which was positioned the printed paper stock assembly or base described above with the pictorially illustrated side facing outward and bearing the bonding layer and the thermoplastic surface material. The assembly was secured in a conventional record press having opposed matrices carrying sound track dies or molds. Pressure was applied to the assembly of core with the treated paper stock on each side of the core to bond the assembly into a composite double-faced record. A pressure between 100–140 kg./cm.² and a press temperature between 90° C. and 140° C. is used. After the pressing step was completed, the record press was cooled to about 30° C. to 40° C. and the finished dual record disk removed from the press.

The preferred composition of the bonding agent for bonding the surface material to the printed surface of the paper stock base is preferably about 50 to 100 grams of polyvinyl alcohol in one liter of water; however, the percentage composition may be varied somewhat from this range. A range from about 25 to 125 grams of polyvinyl alcohol per liter of water is satisfactory and the ratio of polyvinyl alcohol to water is apparently limited only by practical considerations. An alternative bonding composition is one made by first dissolving about 50 to about 100 grams of polyvinyl alcohol in methyl alcohol and adding the solution to one liter of water. Here again, a percentage range of polyvinyl alcohol in methyl alcohol from about 25 to 125 grams is satisfactory.

The preferable amount of adhesive bonding agent to be applied to the paper stock varies from about 3 to 5 grams for a disk seven inches in diameter, 7 to 10 grams for a disk ten inches in diameter, and 10 to 15 grams for a disk twelve inches in diameter. This amounts to a ratio of about .176 gram to .5 gram of bonding agent per centimeter of diameter of the record. If necessary, a suitable bonding agent may be used to bond the paper stock or base to the core of the record. This bonding agent is ordinarily a thermoplastic material which is made plastic in the pre-heating step and the paper stock is simultaneously bonded to the core in the pressing step in the record press as the surface material is bonded to the illustrated side of the paper stock.

Pictorial records made by the above process were found to be free of any rupture or distortion of the pictorial material printed on the paper stock or base. The surface material was found to be transparent and the picture was clear and well defined through the transparent surface material and the sound track impressed therein.

What is claimed is:

1. In the method of making pictorially illustrated phonograph records in which an assembly of a core, a pictorially illustrated base positioned adjacent the core with the illustrated surface facing outward, and a plastic surface material adjacent the illustrated surface of the base is pressed in a record press under heat and pressure to form a composite pictorially illustrated record, the improvement which comprises bonding the surface material to the pictorially illustrated surface of the base with a bonding agent comprising a solution of polyvinyl alcohol.

2. The method of claim 1 in which the base is paper stock and the bonding agent is a solution of polyvinyl alcohol in methyl alcohol and water.

3. The method of claim 1 in which the base is paper stock and the bonding agent comprises a solution of 25 grams to 150 grams of polyvinyl alcohol in one liter of water.

4. The method of claim 3 in which the bonding agent comprises a solution of about 50 grams to 100 grams of polyvinyl alcohol in one liter of water.

5. The method of claim 2 in which the bonding agent comprises about 25 grams to 150 grams of polyvinyl alcohol dissolved in one liter of methyl alcohol to which is added one liter of water.

6. The method of claim 5 in which the amount of polyvinyl alcohol varies from about 50 grams to 100 grams.

7. The process for manufacturing a pictorially illustrated phonograph record in which the pictorial illustration is visible through the transparent outer surface material bearing a sound track, which process comprises applying to a pictorial surface supported on a base, a bonding agent comprising a solution of polyvinyl alcohol in water, dispersing powdered plastic surface material uniformly over said bonding agent and pictorial surface, positioning said base on a core member with the pictorial surface facing outwardly, and bonding the assembly into a composite pictorially illustrated record by means of heat and pressure.

8. The method of claim 7 in which said base is paper stock and said bonding agent comprises a water solution of from about 50 grams to 100 grams of polyvinyl alcohol per liter of water.

9. The method of claim 7 in which said base is paper stock and said bonding agent comprises from about 50 grams to 100 grams of polyvinyl alcohol in methyl alcohol to which is added one liter of water.

References Cited

UNITED STATES PATENTS

| | | | |
|---|---|---|---|
| 2,408,682 | 10/1946 | Porter | 156—326 X |
| 2,418,018 | 3/1947 | Ernsberger et al. | 156—326 X |
| 2,606,851 | 8/1952 | O'Mahoney et al. | 156—326 X |
| 3,058,862 | 10/1962 | Miyahara et al. | 156—327 X |
| 3,135,648 | 6/1964 | Hawkins | 156—327 X |

CARL D. QUARFORTH, Primary Examiner

S. J. LECHERT, Jr., Assistant Examiner

U.S. Cl. X.R.

156—219, 327; 161—42; 260—29.2, 33.4